United States Patent [19]

Tyler et al.

[11] 3,854,035

[45] Dec. 10, 1974

[54] METHOD AND MEANS FOR READING CODED INFORMATION

[75] Inventors: Anton Roy Tyler, Toronto, Ontario; William Matthew Lower; Maurice Kenyon Taylor, both of Weston, Ontario; Robert C. Forsyth, Oakville, Ontario, all of Canada

[73] Assignee: Ferranti-Packard Limited, Toronto, Ontario, Canada

[22] Filed: July 31, 1972

[21] Appl. No.: 276,362

[52] U.S. Cl. .......................... 235/61.11 E, 250/566

[51] Int. Cl. .......................... G06k 7/00, G08c 9/06

[58] Field of Search ..... 178/6, 6.8, 7.1, 7.2, DIG. 1; 235/61.11 E, 61.12 R; 340/146.3 K; 250/555, 566

[56] References Cited

UNITED STATES PATENTS

| | | | |
|---|---|---|---|
| 3,246,126 | 4/1966 | Schlieber et al. | 235/61.11 E |
| 3,600,556 | 8/1971 | Acker | 235/61.11 E |
| 3,644,714 | 2/1972 | Phillips et al. | 235/61.11 E |

*Primary Examiner*—Daryl W. Cook
*Attorney, Agent, or Firm*—Westell & Hanley

[57] ABSTRACT

A surface containing encoded information bordered by bars where both the bars and the information contrast with a background is detected as to location and the information read by sampling the video scan output of a television camera. The effects of motion may be minimized by producing a strobed image in the television camera.

24 Claims, 11 Drawing Figures

METHOD AND MEANS FOR READING CODED INFORMATION

This invention relates to means and a method for detecting by the use of a television camera, coded information on the surfaces of objects moving relative to the viewing axis of the television camera.

It is an object of this invention to provide means and a method utilizing a television camera to produce in the camera, an image of a surface carrying coded information, whose path is arranged to pass through the field of view of the camera, and to scan the image of the object and to analyze the video scan output signal resulting from such scan.

It is an object of this invention to provide means and a method utilizing a television camera to detect the coded information as described in the preceding paragraph, wherein potential ambiguities in the information, caused by movement of the surface during the formation of the image, are controlled by limiting the access of light into said camera which forms said image to an interval of time short enough to avoid overlap of the coded information in the image.

It is an object of this invention to provide means and a method utilizing a television camera to detect coded information on a surface within its field of view, wherein markings on said surface accompanying said coded information are detected to determine when the surface is within the field of view of said camera.

It is an object of this invention to provide means and a method utilizing a television camera to detect said coded information on a surface within its field of view, wherein markings on said surface accompanying said coded information are detected to determine the orientation of said surface.

Figures 3A, 3B, 3C, 3D, 3E, 4A, 4B, 4C:
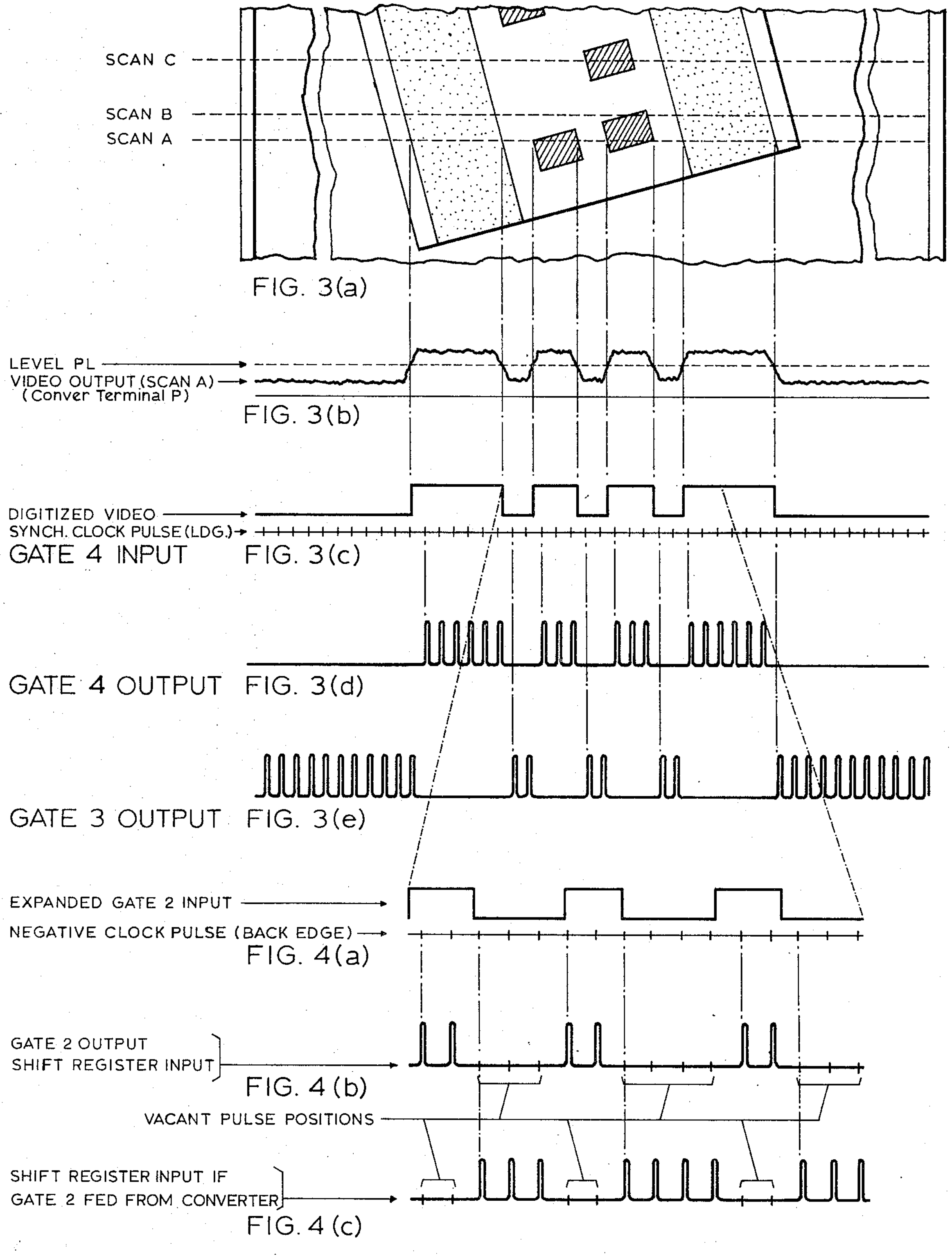
Figure 5:
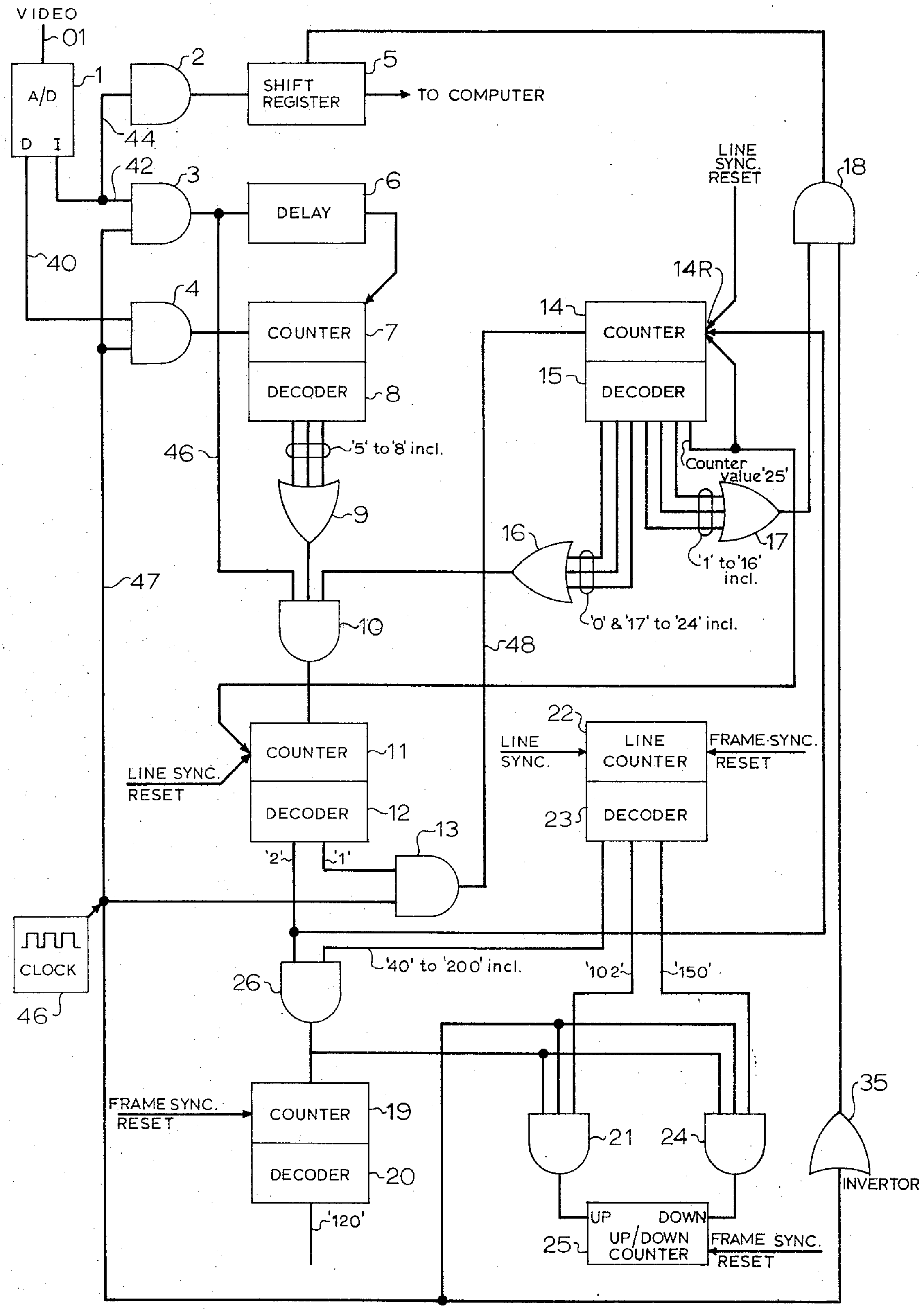

FIGS. 3 consisting of FIGS. 3(*a*) – 3(*e*), and 4, consisting of FIGS. 4(*a*) – 4(*c*) show schematic views of the output signal of the television camera scan output during the detection of the presence of the label and the extraction of the information thereon;

FIG. 5 shows the circuitry for deriving information from the television camera scan output information.

Although the invention covers the extraction of coded information from the surface of an object moving relative to the extraction means, the most common use of the invention is, at this time, thought to be, the reading of labels, containing information such as destination and contents, in coded form on parcels. It will of course be realized that, as a result of the extraction of such information, the parcels may be automatically sorted and routed, and inventory and shipping records automatically compiled.

Figure 2:
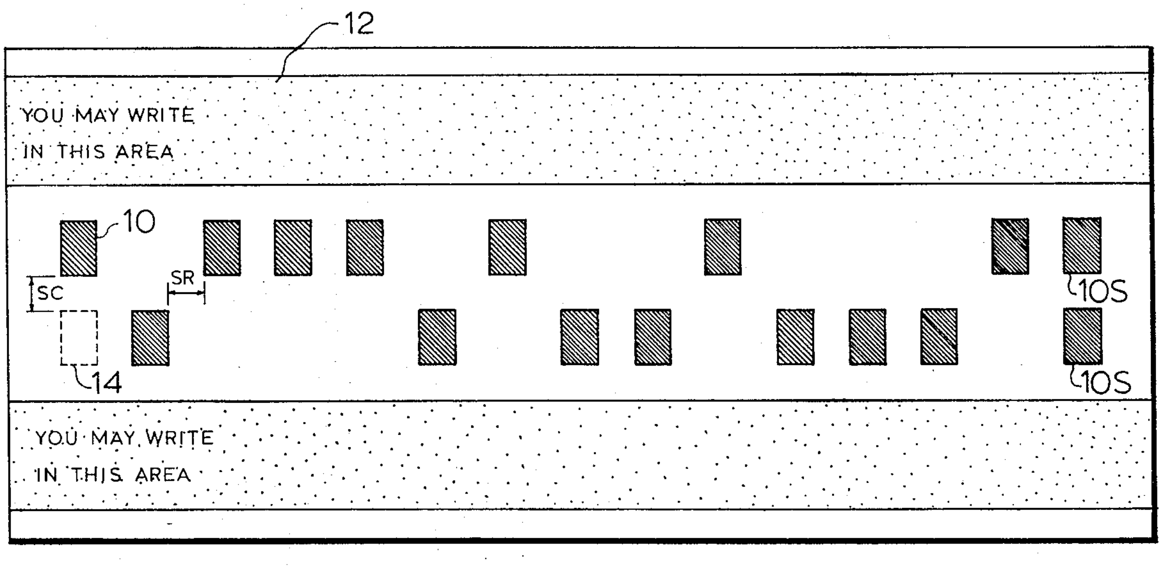
FIG. 2 shows a suggested label for use in accord with the invention.

A label suitable for use with the preferred embodiment of the invention is shown in FIG. 2.

The label as shown provides information defining areas 10 bordered on two opposite sides by thick parallel bar markings 12, also known herein as location marks between which the information is arranged so that it may be scanned perpendicular to the parallel lines. In order that ordinary language text may appear on the surface (as shown) without causing confusion with the coded information, the two wide bars are preferably made a color other than black or dark blue, (the preferred color for the plain language) and the bars 12 of a selected lighter color (say red) will contrast with the plain language writing for the reader. When the encoded information is to be scanned, the surface is illuminated with a color (here green or cyan) complementary to the bar coloring, so that the bars, as well as the encoded information, appear dark in contrast to the background (and hence render the plain language invisible to the TV camera). The method of decoding the information involves detecting the contrast between the coded information and the background. Since the scan will include not only the label but a portion of the surface on which the label is placed and a portion of the conveyor, these portions will preferably contrast with the marks. However, the logic circuitry for detection of the information on the label will achieve such detection in almost all cases whether or not such surface and conveyor contrast with the marks. If desired, for any reason, and noting the comments regarding the parcel and conveyor, it will be appreciated that the surface, coding and illumination could be selected, so that the background is dark and the encoded information is light. The information, preferably in binary form, is conveyed by bars 10 present or not in a specific location, here in columns separated by the dimension $S_C$ and rows by the dimension $S_R$. The red colored bars may be replaced by black in applications where no plain language need appear. The terminology 'row' and 'column' is selected in relation to the scan of the image of the label in the television camera, which will take place (if the label is arranged within the required angular tolerance) transverse to the location bars or from top to bottom in FIG. 2 with successive lines moving from left to right or from right to left in the figure.

In the label shown, a binary code is shown, wherein rows of locations in pairs, disposed from one another transversely relative to the longitudinal extension direction of the bars, i.e., such as 10 and 14, either have an information bar in one location or an information bar in the other, except in the start locations 10S, where two bars appear. Thus a simple parity check is provided at all locations but the start position. If, in the normal coding position, rows (extending vertically in FIG. 2) having two marks (other than in the start position) or having no marks, then in accord with well known techniques an error in encoding may be detected. Although only 14 coding positions (plus the start positions) are shown, this is for ease of illustration. It will be obvious that any number of coding positions may be provided, limited only by the size of the label. Further, although only one data and one data parity column are shown, it will be obvious that as many data columns, as desired, may be used (preferably combined with a data parity line) limited only by the width of the label. The rectangular shape of the bars selected is not essential but is preferable in view of the rectilinear nature of the television scan detection means, and also demonstrates that the label information may be physically produced by a standard bar printer, printing the output of a computer.

Figure 1:
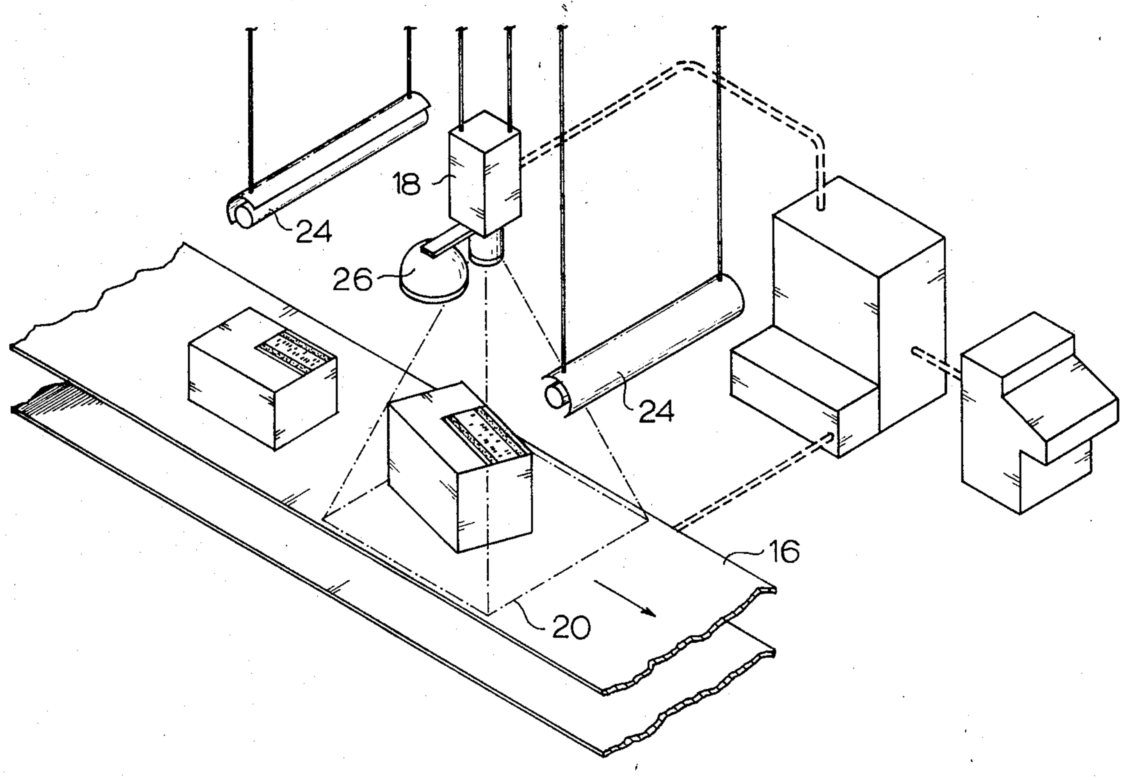
FIG. 1 shows a schematic view of parcels bearing encoded labels in use with the television equipment.

FIG. 1 shows a conveyor 16 with a series of packages thereon, and it will be noted that these are arranged at random within a range for the parallel bars 12 of 20° on each side of the line wherein said bars are parallel to the motion direction. The 20° represents the convenient limits for the extraction of information with the equipment shown in the specific embodiment and with relatively simple computer programming. Comparable limits for pitch and roll (deviation about an axis perpendicular to the viewing direction and perpendicular and parallel to the travel directions, respectively, are ±15° and ±30° respectively.

A television camera 18 is arranged to have a viewing area on the conveyor indicated by the dotted area 20 and a viewing axis preferably perpendicular to the plane of the conveyor. For simplicity the television camera 18 is shown as vertically disposed over the horizontal conveyor with its viewing axis disposed vertically theretowards. However, it will in practice often be found more convenient to locate a 45° mirror over the conveyor to direct the vertical rays from the label and conveyor at a 90° angle to a horizontally disposed camera. In any event, the camera is disposed so that its scan lines bear a predetermined relationship to the orientation of the parcel on the conveyors.

This relationship in the arrangement of the specific embodiment is such that the scan lines are perpendicular to the location bars 12 when the bars are intermediate their skew limits of tolerance.

In accord with the preferred embodiment of the invention, the viewing area for the camera 18 on the conveyor, is illuminated by fluorescent lighting 24 and by a strobe light 26 (i.e., light which may be turned on for a short controlled period and then turned off). In order to allow the use of the red stripe 12 as writing locations but to have these stripe contrast with the background, the label is illuminated with green light so that the black marks 10 and the red marks 12 both give sufficient contrast to the camera. It will be appreciated, for the purposes of decoding the information, that although it is more convenient to have the information marks within the standard range of color of a bar printer, it is possible in general, for both the information and the location marks, to use any color; which in the illumination provided, will contrast with the background of the label.

The television camera, as is well known, scans the image formed therein, to provide an electrical current output (known herein as a 'video scan output signal' or a 'scan output signal') wherein dark and light areas scanned in each line produce signals of high and low amplitude. If desired, equally available within the known techniques in the art and equally useful within the scope of the invention, the video scan output may be provided, for processing by the invention herein described, in the form of a larger amplitude signal for the bright areas scanned and smaller for the dark. As is well known, the scanning progresses line by line down a frame with the video scan portraying the scanned results of each line serially from the top to the bottom of the frame, with the scan signals for each line separated by line synchronization pulses, and so on from one frame to the next, with the frames separate by frame synchronization pulses known as 'frame sync pulses.' As is well known, the television camera conventionally scans, in one field, every second line of those required to completely scan the image, and then scans the omitted lines in the next field. However, for the embodiments at present conceived, for the invention, each frame may be considered as a complete scan of the image, separated by frame synchronization pulses.

In the logic circuitry reference is made to AND and OR gates. It is assumed however, that for each of such logical elements, the counterpart inverse logical element may be substituted with due attention to the sense of the input and output signals required for each stage. Thus where an AND gate is referred to, the gate is of the type where enabling signals of the same sense are required at all inputs simultaneously to provide an output of predetermined sense, the outputs at all other times being of the other sense. Further, where an OR gate is referred to, the gate is of the type where an enabling signal of predetermined sense is only required at at least one input to provide an output of predetermined sense, and provides the opposite sense only when no enabling signal occurs at input. Thus by an AND gate, I include a NAND gate which may be considered as an AND gate with an inverted output, and by an OR gate, I include a NOR gate which may be considered as an OR gate with an inverted output. In general the application does not discuss the relationship between the sense of the output signals of one stage and the required input to the following stage, it being realized that it is elementary to those skilled in the art of logic circuitry that such senses are obviously known and controllable; and that where the sense at the output of one stage is the opposite from that required at the next stage, the necessary inversion may easily be accomplished between stages.

The video scan output signal of the television camera (shown in FIG. 3(*b*) derived from 'scan A' of FIG. 3(*a*)) is provided to an analogue-to-digital converter for the signal. The converter is designed to discriminate between levels in the video scan output signal above and below a predetermined value. The predetermined value is selected to be between the level corresponding to the scan output from scanning in the illumination provided, a location or information mark, on the one hand, and the level corresponding to the scan output from scanning the background on the other hand. The discriminator is designed to provide an output which has one of two levels, as shown in FIG. 3(*c*) wherein the two levels respectively correspond to video scan output signals above and below the predetermined level and the FIG. 3(*c*) level is switched, depending on the crossings of its analogue input with a predetermined level. The output of the converter 1 at gate 'D' where the 'dark' or information signals are of high value and the low or background signals are of low value is applied as one of the inputs AND gate 4. The converter is so designed that a signal which is the inverse output to that of FIG. 3(*c*) is developed at output 'I' of the convertor and applied to AND gates 2 and 3, along lines 42 and 44. A clock 46 is provided to achieve synchronism in the logic circuit. The clock 46 must pulse at a rate relative to the television scan rate, and to the dimensions of the information and location bars so that by sampling the signal of FIG. 3(*c*) at the leading edge of each clock pulse meaningful results may be obtained evidencing the spatial relationship between the location bars and the background, and also between the information marks and the background. Since the scan rate is regular and punctuated by line and frame sync pulses, the number of clock pulses occurring between the start of a line or other position on the scan line or scan line output and a spaced location on the same scan line is a measure of distance along a scan line and a definite width (which is convenient to refer to as a 'pulse width') defines the distance travelled by the scan during the period of the clock pulse. Where, as in the method described, the video scan output is sampled at the frequency of the clock pulse, it will be obvious that for the accurate extraction of information, the length of a 'pulse-width' must be short relative to the dimension in the scanning direction of the smallest marks to be determined, namely the information marks.

In practice, the number of pulse-widths (and this of course is directly relates to location and information mark dimensions in the label design) is preferably 12 for each location bar and 24 in between. However, for ease of illustration in the drawings, only half the pulse frequency is shown, i.e., 6 clock pulses during the scanning of each location bar and 12 between and the specific embodiment is therefore described using the 6 and 12 clock pulse measures. The location marks or bars printed by a computer bar printer will have widths of approximately 6 pulse widths and a spacing of 4 pulse widths in between (3 and 2 respectively in the example). The rising (here leading) edge of the clock pulse indicated by transverse lines on the time base (FIG. 3(*c*)) is used to open gate 4 to sample the output of convertor 1. The results of such sampling are shown in FIG. 3(*d*). Shown immediately below in FIG. 3(*c*) is pulse output from gate 3 resulting from the inverted output from gate I converter 1 at gate 3 by the output of clock 46.

For convenience of illustration the finite width of the clock pulse is not shown in the drawings. The clock pulse lines shown in FIG. 3 therefore represent the leading edge of the pulse while the negative clock pulse lines of FIG. 4(*a*) correspond to the trailing edge of the clock pulse and in the preferred embodiment trail the clock pulse by slightly more than one-half the pulse period. The state of shift register 5 reflects the state of the inverse signal at gate 2, at sampling times occurring at the frequency of pulses from clock 46 but out of step therewith as hereinafter described.

FIG. 3(*a*) shows a portion of the image formed inside the television camera and scan lines A, B and C following portions of FIGS. 3 and 4 are derived from scan line A in accord with the normal scan of the camera, extending thereacross. FIG. 3(*b*) shows the video scan output signal resulting from scan line A, television cameras being conventionally but not necessarily designed to provide a high amplitude output signal for dark areas and low amplitude for high areas. The scan output signal is supplied along the line 01 to the analogue to digital convertor 1. This convertor 1 is designed, as previously explained, to discriminate between outputs along line 01 above and below a predetermined level and to provide a signal of one level when the magnitude is above the predetermined level and of another level when the magnitude is below the predetermined level. The predetermined level PL (FIG. 3(*b*)) is selected approximately midway between the magnitude of signal resulting from the dark information of location marks and the magnitude of the signal resulting from the bright background. The output of the convertor at terminal D is then shown in FIG. 3(*c*) as 'digitized video' and is provided along line 40 to AND gate 4. The analogue to digital convertor is also designed to provide at gate I an output which is the inverse of that shown in FIG. 3 to AND gates 2 and 3.

Gates 3 and 4 also have inputs from the clock output 46 and are designed to provide an output pulse created by the leading edge of the clock pulse.

The output of AND gate 4 (FIG. 3(*d*)) is fed to counter 7 where the pulse output is counted. The inverse pulse output of gate 3 delayed by a convenient fraction of the clock pulse period to avoid ambiguity with incremented additions to counter 7 is used to reset counter 7. (FIG. 3(*e*) shows the gate 3 output without delay). Thus the counter 7 is designed and connected to count the number of each series of pulses appearing at the output of gate 4 corresponding to the scanning of a dark area and to be reset by the first pulse of a series from gate 3 indicating the beginning of a bright area scanned. The values in counter 7 are provided to decoder 8 and the decoder 8 is connected to provide decoded outputs when the pulse counts in counter 7 correspond to the range of widths of a location bar 12 within the angular range of acceptable skew measurements and within the acceptable height range (which height determines the bar width in the image). Thus with an expected width of 6 pulses for a location bar the decoder will be designed to produce outputs at counts between 5 and 8 inclusive. When the counter 7 stands at any of these values decoder 8 provides an output on one of the four (i.e., '5', '6', '7', '8') lines to OR gate 9, producing at its output an enabling signal to AND gate 10.

AND gate 10 is also enabled by a pulse from gate 3 (signalling the end of a dark period) along line 46 and from OR gate 16 when the counter 14 stands at 0 or '17'–'24.' Since counter 14, as hereinafter explained, is only enabled to count after a location bar has been scanned, counter 14 is at 0 at the beginning of a scan line. Thus starting with scan line A, as the scan moves from left to right across the frame, gate 10 provides an output to counter 11, the first time during the scan of a line counter 7 stands at a count of 5–8 at the end of a dark area.

Thus, in response to the scan crossing location bar (within the orientation range) or dark area of corresponding width, counter 11 counts 1 and activates the '1' output of decoder 12. While the decoder 12 output is '1', AND gate 13, enabled thereby, provides pulses resulting from the leading edge clock pulses from clock 46 to counter 14 along line 48 as long as counter 11 stands at '1.'

The decoder 15 connect to counter 14 provides three types of output. Firstly, outputs corresponding to counter values of 0 and '17' to '24' are connected to OR gate 16 to provide an enabling signal to gate 10, when counter 14 stands at these values. The scan length represented by the pulse counts between 17 and 24 represents the sum of the pulse width spacing between the location bars (12–16) and the width 5–8 of the second-scanned location bar, both within the acceptable range of orientation. Secondly, decoder 15 outputs corresponding to 1 to 16 are provided to gate 17 whose output, in combination with gate 18, is designed to enable inverted clock pulses (from clock 46 and inverted by invertor 35) to pass through gate 18 when the count on counter 14 is 1–16 inclusive and to inhibit the passage of such pulses at other times. The inverted clock pulses are the pulses from clock 46 inverted at invertor 35 but remaining in synchronism therewith. Thirdly, output from decoder 15 corresponding to a value of 25 in counter 14 is used to provide a reset signal to the reset terminal 14R of counter 14 and counter 11.

In operation then with the circuit as described this far, no signals are provided to the counter 14 until a dark area (see scan line A) is scanned. If a dark area smaller than 5 pulse widths or larger than 8 pulse widths is scanned, this is counted on counter 7 but the counter is reset by the first pulse after the commencement of the pulse of gate 3 at the commencement of a bright interval and no resultant output occurs at gate 10 since the pulse at gate 3 did not occur when counter 7 stood at 5, 6, 7 or 8. Since there is no output on the decoder 12 '1' output, counter 14 remains at 0 and through decoder 15 and OR gate 17 disables gate 18 so that nothing is shifted into shift register 15. Counter 14 at 0 also provides one of the three necessary enabling signals for gate 10.

This state continues until counter 7 has 'counted' a dark area of between 5 and 8 pulse widths at the time the first pulse from gate 3 signals the passage by the scan from a dark to a light area. Then all three inputs to gate 10 are enabled. The counter 11 then counts '1' indicating that a location bar (or dark area of similar width) has been scanned. The counter 7 is of course reset after such total count of a dark area by the delayed reset pulse from gate 3.

As soon as counter 11, as described above, reached the count '1', the output of decoder 12 enables gate 13 and the resulting clock pulses to pass through gate 13 to counter 14 and are counted therein from '1' upward causing the output of decoder 15 for counts from '1'–'16' to disable gate 10 through gate 16 until at least 17 is reached in counter 14 and to enable gate 18 through gate 17 for counts from 1–16.

For counts on counter 14 from '1'–'16' the inverted clock pulse actuates the shift register 5 on the rising (trailing) side of the inverted pulse and clocks the input (FIG. 4(*a*)) thereto from gate 2 at intervals trailing the regular pulse output by the pulse width or approximately one-half the clock period. The shift register has 16 positions corresponding to the 16 pulse positions fed thereto during a line scan. The pattern of pulses produced from the output of gate 2 in shift register is shown in FIG. 4(*b*) where pulses occur in the areas between the bars, and no pulses occur during scanning the two information marks 10. Those pulses or their absence appear as binary signals (pulse or no pulse) in successive stages of the shift register. In case it had been preferable, for the use of the computer, to provide a shift register 5 carrying record of the presence of pulses during information marks and no pulses when there are no information marks, then gate 2 could have been fed from the gate D of the analogue to digital converter 1 rather than from the inverse output, and the contents of the shift register would have been as shown in FIG. 4(*c*) indicating two information bars scanned (scan line A) between the location bars. In either event the shift register after clocking by the inverse clock pulses permitted through by gate 18 contains a series of stages containing a 'one' or 'zero' for each pulse position corresponding to a dark area and a 'zero' or space for each pulse position corresponding to a bright area or vice versa, and in either event, the record of the scan in the shift register may easily be read by the computer. It will be noted that since 16 pulses are read into the shift register and the space between the bars may be 12–16, depending on the angle of skew, that the shift register, in addition to a binary record of the information may have 1–4 stages corresponding to a portion of the second location bar. However, the location of the stages of the shift register, corresponding to the second location bar scanned makes the character of such stage easily detectable by the computer which will discriminate between an information bar and a location bar. Note also that the only information row, with two bars indicates the start of the information so that from the position of the start bars the computer may detect the correct order in which the information (which may be scanned in either orientation) is to be processed.

When counter 14 reaches the counts of 17 to 24 inclusive, the minimum to maximum pulse width of the expected space between the bars plus the pulse width of the second location bar, has been scanned. For counts from 17–24 in counter 14, respective outputs from decoder 15 through OR gate 16 supply an enable signal to gate 10 which is also enabled by the first pulse from gate 3 signalling the transition from dark to light in the scan. If a second dark area of the width of a location bar of 5–8 pulse widths (correct tolerance) is scanned over an interval ending in counts in counter 14 between 17–24 (correct location relative to first location bar) then gate 10 is enabled by simultaneous enabling outputs at gates 3, 9 and 16 and counter 11 is shifted to the count of 2. The '2' output of decoder 12 is activated to provide one enabling signal to gate 26. Signals passing gate 26 as hereinafter explained, are counted by counter 19. Counter 19 is connected to be reset at the time of the frame sync pulse (i.e., reset between frames) and, when gate 26 is enabled, counts the number of lines, in a frame, wherein the two correctly spaced location bars are detected.

At the same time, as counter 11 moves from 1 to 2, gate 13 formerly enabled by the 1 output of decoder 12, is disabled. Counter 14 will be reset at the end of each line, by a signal derived from the line sync pulse, if it has not reached 25, or each time it reaches 25, by the '25' output of its own decoder 15.

When the counter 11 reaches '2' the pattern of information marks (or any other contrasting material) for the scan of a single line, will be recorded in shift register 5. Such pattern will not, however, in the preferred embodiment of the invention be transferred to the computer until it has been determined that the whole information label is present in the field of view of the television camera. This is so that the computer will only receive the line by line information from the shift register when the position of the label is such that the sequential scan records from shift register 5 will provide a record of the scan of a complete label. The determination of the presence of the label in the field of view is achieved by counting, per frame, at counter 19, the number of lines per frame in which two properly spaced location bars are detected. The location of the label at a desired position in the field of view is also determined by AND gate 26 provided between the '2' output of decoder 19 and counter 19 to prevent the initiation of counting lines with two properly spaced location bars by counter 19 until a certain frame line has been reached. Thus a line counter 22 is arranged in any desired manner to count the lines of each frame, (such as (as shown) by counting line sync pulses and resetting on every frame sync pulse). A decoder 23 is arranged to provide an output corresponding to the desired upper line position occupied by the label at the time of the frame scan. For example, wiith 262½ lines to a frame, assuming that a properly oriented label will encompass 155–160 lines and it may be desirable to detect the label in the upper half of the frame, say between the 40th and 200th lines. The decoder 23 will therefore, be arranged to provide an output at line counts 40 to 200 (incl.) to enable gate 26 during this interval to allow the counting of lines with properly spaced location bars producing a '2' output from decoder 12. Counter 19 is connected to be reset by a signal originated by each frame sync pulse. Between such reset signals counter 19 counts the lines with correctly spaced double bars starting with line 40. Decoder 20 is designed to provide an output when the minimum number of good lines for the label being in the correct position has been detected, in this example 120 lines. The '120' output of decoder 20 is used to signal the computer, that the shift register 5 will contain information about a correctly positioned label in the scan lines of the next field. If the computer is so programmed, the computer will store and process the successive line records in the shift register resulting from scanning between the location bars, on the next field. From the read-out of the shift register the computer may decode the encoded information.

The use of 120 lines to indicate the presence of a label whose bars encompass 160 lines is determined by the fact that it has been found that such determination will ensure that in substantially all cases the complete label will be in the next field scanned. Thus the '120' count between lines 40 and 200 may indicate that some lines have not been counted due to noise in the scan signal or that part of the label is above line 40 although within the field with 120 lines between lines 40 and 200. In either event the detection of 120 lines will indicate in a high enough percentage of cases for efficient operation, that the next field may be used to extract the information. Obviously the number 120 will vary with the illumination, the camera and other parameters. Given the occurrence of a '2' output (or other location identification signal) from decoder 12 or equivalent device, combined with an ability to count the number of scan lines down a field, there are many alternative counting or logical arrangements to deduce the correct positioning of the label. However, such alternative arrangements will be dependent on ability to recognize that two location bars (or other arrangement of location bars) have been detected in a scan line.

The counters herein are reset as follows:

Counter 7 from delay 6.

Counter 11 at each line sync pulse and each count of '25' from decoder 15.

Counter 19 at each frame sync pulse.

Counter 14 at each line sync pulse.

at each count of '2' from decoder 12 at each count of '25' from decoder 15.

Counter 22 at each frame sync pulse.

Counter 25 at each frame sync pulse.

The feeding of the information to the computer with a continuously repeating scan of a moving image places limitation on how close the information marks may be placed and/or how fast the label may travel, since the label may travel a material distance during the scanning of a single frame, and will cause ambiguity in information marks too closely spaced, having regard for the speed of the conveyor.

Therefore, it is preferred, once the proper location of the label in the camera image is detected by the counter 19 and decoder 20, to produce an image, wherein the information may be scanned, by limiting the illumination entering the camera to produce the image, to a short enough interval that the moving information marks cannot move sufficiently, or be sufficiently blurred, to be ambiguous. The most suitable timing for such illumination to occur, is during the frame sync pulse and the interval of said illumination is therefore made the approximate interval of such pulse. It will be appreciated, however, that the length and occurrence of the short-time illumination may be varied to suit specific situations and that, once the scan has located the location marks in the desired position from scanning the information, the short-time illumination (here sometimes referred to as 'strobing') takes place at a time relative to the frame scan, so that the information may be completely scanned between such strobing.

Since, as is well known, the charge created by the image in a television camera remains until the image is scanned or replaced by a later image, the form of the television scan output signal will be the same whether continuous or strobed illumination is used.

The short interval illumination, may be achieved in various ways. The regular green illumination provided here by the fluorescent lamps, may be continued while light admitted to the camera, may be restricted by a mechanical shutter or for speed, an electro-optical shutter. However, I prefer to provide a strobe light in addition to the fluorescent source, so that, on detection of the label in its correct location, the fluorescent light may be switched off and the strobe light turned on and off during the frame sync interval. The strobe light may be any light source which may be switched on and off quickly enough to provide the interval within the desired tolerance and which will provide sufficient illumination to create a sufficiently bright image for scanning. There the strobe light will also be green.

The computer will be programmed to detect the output of decoder 20 and responsive thereto to cause switching off of the fluorescent lights and switch on and off the strobe light 26 illuminating the label between frames, so that the image scanned in the next frame will provide a series of contents for the shift register, as previously described in connection with the continuous scan; which may be fed, in one of the pulse forms shown, to the computer. Thus the operation of the circuitry shown in FIG. 5 is the same when the image is produced by strobing as by a continuous scan.

Once the information is assimilated by the computer, the computer will be programmed to switch off the actuation for the strobe light and to switch on the continuous lighting for the detection of the next label or another parcel travelling down the conveyor.

It will be appreciated that the speed and reaction time of the circuitry and computer software may be sufficiently fast that there will, in some design alternatives, be the chance that the same label, scanned to extract the information, be again detected in the correct location and the information again scanned. This may be avoided by sufficient spacing of the labels bearing parcels on the conveyor (which may be assisted by making the conveyor of the tray-type or of some other divided type with one label bearing parcel to be placed per division. Without restriction of the parcel location, the logic circuitry may be augmented to avoid scanning of the same parcel, by requiring that there be detected the absence of the required number of double bar lines in the scanning range (here between frame lines 100 and 160) between one acceptance of information by the computer and the next.

There will now be described, the mechanism for detecting skew or the deflection of the label about an axis parallel to the viewing direction of the camera. The measurement of the skew angle may serve three purposes. In the arrangement of the preferred embodiment, where limits are set on the allowable amount of skew for information detection, the skew measurement may be used as a means for detecting parcels misaligned to an extent outside the tolerance, to prevent the reading of the information from the shift register into the computer (which the computer is not programmed to handle), or to actuated means (not part of this invention) for rejecting such measurement. Secondly, the skew measurement may be used to assist the computer in accord with its programming in dealing with the information obtained. It should be noted that the logic circuitry described, controlling the supply of information to that scanned between the bars, avoids effects from skew displacement of the bars relative to each other. However, the effects of the skew do not show in the pulse measurement of the width of the information marks, and of the background space thereabout. Thus the skew measurement information may be used to assist the computer in modifying the information received, to correct for the effects of skew. Thirdly, it will be obvious that the skew measurement together with the information scan recorded in the shift register and the knowledge of the scan lines wherein this information is obtained; supply sufficient information to allow the computer or in fact hardware, with sufficient programming, to determine the character of the information at any orientation which allows the location bars to be detected. However, it is preferred to limit the amount of skew to the ranges discussed, to consequently simplify the computer programming and to reject labels outside the permissible skew orientation.

The preferred method of calculation of the skew of the label will now be described. The skew angle SA is shown in FIG. 3. The skew measurement involves the use of a line counter 22. The line counter is connected to count signals originating with the line sync pulse and is reset by a signal originating with the frame sync pulse. Thus, in any frame, the line counter 22 contains a count indicating the line being scanned. Two lines are selected sufficiently spaced that a good skew measurement may be obtained. These lines need not be within the information scanning area unless the strobing effect is required to ensure that conveyor movement does not unduly affect the skew measurement.

Preferably these lines are chosen in the position of the frame where the strobe takes place. Thus the lines selected might be 102 and 150. The decoder 23 for line counter 22 is therefore provided with outputs which enable AND gates 21 and 24 respectively at line counts 102 and 150, respectively. Each gate 21 and 24 is also enabled by the '2' output of decoder 12 through gate 26 and by the clock pulse from clock 46. The output of gate 21 is connected to the 'count-up' directional terminal of a bi-directional counter 25. The output of gate 24 is connected to the count-down directional terminal of counter 25. The counter 24 is reset at the end of each frame. Thus, when the 120nd frame line is encountered, counter 21 is enabled after the output of decoder 12 reaches the '2' output, signalling the end of the second bar. The clock pulses passing gate 21 cause counter 25 to count up and supply at the end of the scan line a measure of the distance from the second location bar to the scan edge. The clock pulses are stopped at the end of the 102nd scan line, by the disabling of the lead from decoder 23. When the count in counter 22 reaches 150 for the 150th scan line, gate 24 is enabled and on the enabling of '2' line from the decoder 12, the pulses are counted down by counter 25 to the end of the 150th line. The count remaining in the two-way counter after the end of the 150th line is a measure of the slope or 'skew' of the label. The sign of the count indicates the sense of the slope, i.e., a positive residual count indicates a slope as shown in FIG. 3, while a negative count will indicate a slope in the opposite direction. The residual contents of the two-way counter 25 after its 'count up' and 'count down' are therefore available for use by the computer, may, if desired, be replaced by two separate counters, one for counting line 102 from gate 21, the other for counting line 150 from gate 24. In such alternative the information may be separately fed to the computers from the counter.

It will be noted that the other limits or parcel orientations are determined so that the information will not be ambiduous. Thus, pitch (rotation about an axis parallel to the conveyor but perpendicular to its motion direction) will tend in the camera image to shorten the information bars and the space between them (increasing the apparent skew) while roll, orientation of the label about the travel direction axis, will tend to narrow the conveyor lines and to decrease the apparent skew. Thickness of the parcel or other article raising the level of the information surface relative to the conveyor increases the dimensions of the information bars and the location bars in the image. All of the suggested limits will be determined for the parameters including the mode of programming the computer, the vertical scan spacing of the image in the television camera (effectively setting the resolution on the vertical dimension) and the clock pulse frequency, which effectively sets the resolution in the horizontal dimension.

The preferred embodiment refers to the provision of scanning with continuous lighting until a label is detected, correctly located, followed by the provision of a strobed or short period illuminated image for scanning the information. It will be obvious that, if desired, short interval or strobed illumination may be used for both location of the location bars as well as detection of the information.

Although location bars of specific width and spacing, and information bars of spacing width and spacing are described in the specific embodiment, it will be obvious that other arrangements and dimensions of location bars may be used permitting the detection of the location and orientation of such location bars by suitably designed logic circuitry and that other shapes or dimensions of information marks may be used with obvious alteration of the logic circuitry The information marks will be for binary systems, that is, the information is embodied in their presence or absence at specific locations.

I claim:

1. Method of extracting information encoded on a surface movable along a locus relative to a television camera, wherein the information is conveyed by the presence or absence of information marks contrasting with a background, wherein location marks indicating the location and orientation of said information marks, on the one hand, contrast with said background, on the other hand;

providing a television camera, whereby the image formed in said camera is scanned, moving said surface through the field of view of said camera;

obtaining the scan output signal resulting from scanning such image;

determining, at regular predetermined intervals during the scanning of a line along said image, whether the scan output signal is above or below a predetermined level, where said level is selected to discriminate between the signal resulting from said location and information marks, on the one hand, and the signal resulting from said background, on the other hand, whereby analysis will determine the presence, location and orientation of said information marks on each line, responsive to the detection of the presence, location and correct orientation of said location marks, producing on said camera, an image through illumination for a period short enough to avoid ambiguity in said information marks, due to movement, thereof relative to the televisions camera, converting, at regular predetermined intervals during the scanning of a line along said image, the electrical video output resulting in such scan into a two level signal wherein one level will include the result of scanning the image of said background, and the other level will include the result of scanning the image of said information marks;

producing an output which provides a series of pulses at the said regular intervals during the existence of one of said levels, and the absence of such pulses at the other of such levels.

2. Method of extracting information encoded on a surface movable along a locus relative to a television camera wherein the information is conveyed by the presence or absence of marks of predetermined dimension contrasting with a background, comprising the steps of:

providing a television camera, moving said surface along said locus relative to said camera to pass through the field of view thereof, responsive to the presence of said image within said field of view, analyzing the signal resulting from the scan of the image in said television camera, determining whether the scan output signal is above or below a predetermined level at predetermined regular intervals during the scanning of a line along said image, where said level is selected to discriminate between the signal resulting from said marks and the signal resulting from said background, where said determination is made at regular intervals along a scanned line, short relative to the dimension in the scanning direction of such marks.

3. A method as claimed in claim 2 where the illumination creating an image in said camera is limited to intervals short, relative to the time for said marks to move a distance sufficient to cause ambiguity on said information.

4. A method as claimed in claim 2 wherein the creation of an image in said camera is limited to intervals less than the interval between frame scans in the television camera.

5. Method of extracting information encoded on a surface wherein information is identified and located by the presence or absence of marks in a predetermined arrangement and orientation of predetermined dimension contrasting with a background, comprising the steps of:

providing a television camera, forming an image therein, moving said surface relative to said camera to pass through the field of view thereof, determining at predetermined regular intervals during the scanning of a line along said image whether the scan output signal is above or below a predetermined level, where said level is selected to discriminate between the signal resulting from said marks and the signal resulting from said background, where said determination is made at regular intervals along a scanned line, short relative to the dimension in the scanning direction of said marks.

6. A method as claimed in claim 5 wherein said information marks are arranged in a predetermined spatial relationship on said surface to at least one location line arranged to extend in a direction within a predetermined angle of a direction, which in the camera image, is a perpendicular to the scan, identifying by said interval determinations, the intersection of a scan line with a location line, determining from the number of lines in a frame in which said identification is made, the presence of said information within said image.

7. Method of determining the presence of a pattern within the field of view of a television camera, wherein the pattern includes a location portion comprising lines of predetermined relative orientation, dimension, and spacing contrasting with a background comprising the steps of:

providing a television camera, moving said surface relative to said camera to pass through the field of view thereof, where the location portion is arranged within a predetermined range of angles relative to the scanning direction of said camera, analyzing the scan output signal resulting from scanning the image formed in said television camera, providing a two-level signal with the level determined by whether the scan output signal is above or below a predetermined level at predetermined intervals during the scanning of a line along said image, where said predetermined level is selected to discriminate between the signal resulting from said marks and the signal resulting from said background, identifying from the two level signal, the intersection of a scan line with said location marks, counting the number of said predetermined intervals between a line of said location portion and the edge of the scan frame, on at least two of said scan lines of predetermined spacing.

8. Method of extracting information encoded on a surface wherein the information is conveyed by the presence or absence of information marks of predetermined dimensions in locations having a predetermined relationship to each other where said information marks contrast with their background, the steps comprising:

providing a television camera;

responsive to the location of said information in the field of view of said camera, in a predetermined range of orientations relative thereto, scanning the image of said information, determining at predetermined intervals during the scanning of a line along said image, whether the scan output signal is above or below a predetermined level, where said level is selected to discriminate between the signal resulting from said marks and the signal resulting from said background;

where said determination is made at regular intervals along a scanned line, short relative to the dimension in the scanning direction of said marks.

9. A method as claimed in claim 8, where the illumination creating an image in said camera is limited to intervals short, relative to the time for said marks to move a distance sufficient to cause ambiguity on said information.

10. A method as claimed in claim 8 wherein the creation of an image in said camera is limited to intervals less than the interval between frame scans in the television camera.

11. Method of using a television camera in the extraction of information encoded on a surface, wherein the information is conveyed by the presence or absence of information marks of predetermined dimension contrasting with a background, wherein location marks indicating the location and orientation of said information marks contrast with said background, providing a television camera, moving said surface through the field of view of said camera, controlling the image forming illumination reaching said camera so that the image formed therein are formed in a time interval not greater than the interval between frames of the camera television scan, scanning such images, determining whether the output signal resulting from said scan is above or below a predetermined level at predetermined intervals during the scanning of a line along such image, where said level is selected to discriminate between signals resulting from said background and the signals resulting from said marks, where said determination is made at regular intervals along a scanned line, short relative to the dimension in the scanning direction of said marks.

12. Means for detecting information encoded on a surface movable in a locus relative to a television camera, wherein the information is conveyed by the presence or absence of information marks contrasting with a background, in the illumination provided for forming an image in said television camera wherein location marks of predetermined dimension indicating the location and orientation of said information marks also contrast with said background, the combination comprising:

a television camera arranged to have a field of view including a portion of the locus of said surface, means for determining at a plurality of predetermined regularly time-spaced intervals, whether the scan output of said camera is above or below a predetermined level where said level is selected to discriminate between the scan signal resulting from said marks, and the scan signal resulting from said background, where said intervals are selected to provide that the scan distance between said intervals is short relative to the dimension in the scanning direction of said marks, means for analyzing the results of said determination and ascertaining whether said information marks are within said field of view, means responsive to the detection of the location of said information on an image in said camera, to produce an image therein; over an interval short relative to the time taken for said information marks to travel a distance to create ambiguity therein in said television image, means for converting at predetermined time spaced intervals, short relative to the time to scan an information mark, the electrical video output resulting from scanning said short interval image, into a pulse signal occuring where the pulse has one level corresponding to the scanning of an information mark, and another level corresponding to the scanning of said background.

13. Means for detecting information encoded on a surface, movable on a locus relative to a television camera, wherein the information is conveyed by the presence or absence of marks of predetermined dimension contrasting with a background, comprising in combination:

a television camera arranged to have a field of view including a portion of the locus of said surface, means for determining at a plurality of predetermined time-spaced intervals, whether the scan output of said camera is above or below a predetermined level where said level is selected to be between the signal resulting from said marks and the signal resulting from said background;

where said intervals are selected to provide that the scan distance between said intervals is short, relative to the dimension in the scanning direction of said marks.

14. Means as claimed in claim 13 wherein means are provided to ensure that the image formed by said camera for such scan is formed in a time interval small relative to the time for sufficient movement of said information relative to said camera to cause ambiguity in said information.

15. Means for detecting information encoded on a surface movable in a locus relative to a television camera wherein the information is identified and located by the presence or absence of marks of predetermined dimension in a predetermined orientation contrasting in the illumination provided for the television camera with a background, comprising in combination:

a television camera arranged to have a field of view including a portion of the locus of said surface, means for receiving the scan output of said television camera and producing therefrom at predetermined intervals during the scanning of a line along said image, a binary signal whose level is determined by whether the scan output signal is above or below a predetermined level, where said level is selected to discriminate between the signal resulting from said marks and the signal resulting from said background, where said intervals are selected to provide that the scan distance between said intervals is short, relative to the dimension in the scanning direction of said marks.

16. Means as claimed in claim 15 wherein said surface information marks are in a predetermined spatial relationship on said surface to a pattern defining a direction which in the camera image is within a predetermined angle of a perpendicular to the scan, means for analyzing said binary signal and identifying the intersection between a scan line and said pattern when said defined direction is within said predetermined angle, means for determining from the scan lines in a frame wherein said identification is made, the presence of said information marks within marks said frame.

17. Means for determining the presence of a pattern movable relative to and through the field of view of a television camera wherein the pattern includes a portion having lines of predetermined relative orientation and spacing contrasting with a background, comprising in combination:

a television camera arranged to have a field of view including a portion of the locus of said movable pattern;

means for receiving the scan output of said television camera and producing at a plurality of predetermined intervals per line of said scan, a signal having one of two levels determined by whether said scan signal is above or below a predetermined level, means for analyzing said two level signal to identify the intersection of a scan line with said pattern, means for determining from the scan lines wherein such intersection has been identified when said pattern is located in said field of view.

18. Means as claimed in claim 17 wherein means are provided to ensure that the image formed by said camera for such scan is formed in a time interval small relative to the time for sufficient movement of said information relative to said camera to cause ambiguity in said information.

19. Means for determining the presence of a pattern movable relative to and through the field of view of a television camera wherein the pattern includes an unchangeable portion having lines of predetermined relative orientation and spacing contrasting with a background, comprising in combination:

a television camera arranged to have a field of view including a portion of the locus of said surface;

means for receiving the scan output of said television camera and producing at a plurality of predetermined intervals per line of said scan, a signal having one of two levels determined by whether said scan signal is above or below a predetermined level, means for analyzing said two level signal to identify the intersection of a scan line with said pattern, means for counting for at least two predetermined scan lines, the interval between a predetermined line of said pattern and an edge of said frame.

20. Means for extracting by means of a television camera, information encoded on a surface wherein the information is conveyed by the presence or absence of information marks of predetermined dimension in locations having a predetermined relationship to each other where said information marks contrast with their background, in the illumination provided for said camera, comprising, in combination:

a television camera, arranged in relation to said surface so that said surface will pass through the field of view of said camera, means for determining at predetermined intervals during the scanning of a line by said camera whether the scan line is above or below a predetermined level, wherein said level is selected to be between the level resulting from the scanning of said marks and the level resulting from said background, where said means is designed to provide that the scan distance between said intervals is short, relative to the dimension in the scanning direction of said marks, means resulting from said determination, for providing an output signal at times corresponding to said intervals, having one value corresponding to values above a predetermined level and another value corresponding to values below said predetermined level, means for analyzing said signal to determine the presence and location of said marks.

21. Means as claimed in claim 20 wherein means are provided to ensure that the image formed by said camera for such scan is formed in a time interval small relative to the time for sufficient movement of said information relative to said camera to cause ambiguity in said information.

22. Means for using a television camera to extract information encoded on a surface by the provision of areas of predetermined dimension designed to contrast, in the illumination provided for such surface for viewing by said camera, with the background on said surface, comprising in combination:

a television camera arranged to scan a field of view including the locus of said information, means for sampling and discriminating as to the level of the video output of said camera at predetermined intervals during the scanning of a line and providing a signal of one of two values dependent upon whether the sampled signal is above or below a predetermined level, where said level is selected to discriminate between the signal resulting from said areas and the signal resulting from said background, where said determination is made at regular intervals along a scanned line, short relative to the dimension in the scanning direction of said areas, means for analyzing the signals resulting from the presence and location of said areas.

23. Means for using a television camera to extract information encoded in marks on a background, and formed to provide contrast in the image formed in said camera, wherein said information and background may move at up to a predetermined velocity transversely relative to the viewing direction of the television camera, comprising in combination:

means synchronized with the scan of said camera for limiting the formation of an image therein to a period not greater than the interval between frames on said scan, means receiving the video output of said scan and discriminating between video outputs above and below a predetermined level, where said level is selected to cause to be intermediate between the level of the signal resulting from scanning said information and the level of the signal resulting from scanning said background.

24. Means utilizing a television camera to extract information encoded on a surface wherein the information is conveyed by the presence or absence of information marks contrasting with a background, wherein location marks indicating the location and orientation of said orientation marks also contrast with said background, wherein said surface moves on a locus relative to the field of view of said camera, comprising in combination;

a television camera, located and arranged to produce an image of such surface at some portion of said locus, means for controlling the illumination creating an image in said camera, designed to allow creation of said image once per frame of said scan;

means for deriving from scanning said image, a signal occurring at a plurality of regular intervals per scan line and assuming one magnitude or another magnitude when said video scan output is on one and the other side respectively of a predetermined level, wherein said level is selected so that information and location marks cause a video scan output on one side of said level and said background causes a video scan output on the other side of said level.

* * * * *